United States Patent
Englmeier

(10) Patent No.: US 11,135,688 B2
(45) Date of Patent: Oct. 5, 2021

(54) METHOD FOR PRODUCING A MICROCHANNEL BUNDLE HEAT EXCHANGER

(71) Applicant: Dr. Ing. h.c. F. Porsche Aktiengesellschaft, Stuttgart (DE)

(72) Inventor: Michael Englmeier, Lenting (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 18 days.

(21) Appl. No.: 16/747,972

(22) Filed: Jan. 21, 2020

(65) Prior Publication Data
US 2020/0238450 A1    Jul. 30, 2020

(30) Foreign Application Priority Data
Jan. 24, 2019 (DE) ...................... 10 2019 101 740.8

(51) Int. Cl.
    *B23P 15/26*      (2006.01)
    *B21D 53/06*      (2006.01)

(52) U.S. Cl.
    CPC .............. *B23P 15/26* (2013.01); *B21D 53/06* (2013.01)

(58) Field of Classification Search
    CPC .............. F02B 29/0425; F02B 29/0437; F02B 29/0418; F02B 29/045; F02B 29/0456; F02B 29/0462; B23P 15/26; Y10T 29/4935
See application file for complete search history.

(56) References Cited

U.S. PATENT DOCUMENTS

| | | | | | |
|---|---|---|---|---|---|
| 4,140,637 | A | * | 2/1979 | Walter | B01D 63/021 210/321.79 |
| 4,172,794 | A | * | 10/1979 | Sigdell | B01D 63/022 210/232 |
| 4,761,864 | A | * | 8/1988 | Berger | D03D 15/68 28/218 |

(Continued)

FOREIGN PATENT DOCUMENTS

| CN | 2482420 | 3/2002 |
|---|---|---|
| CN | 102472593 | 5/2012 |

(Continued)

OTHER PUBLICATIONS

German Examination Report dated Mar. 25, 2020.
Chinese Search Report dated Apr. 1, 2021.

*Primary Examiner* — Jason L Vaughan
(74) *Attorney, Agent, or Firm* — Gerald E. Hespos; Michael J. Porco; Matthew T. Hespos

(57) ABSTRACT

A method for producing a microchannel bundle heat exchanger (1) includes providing a multiplicity of tubular microchannels (2); incorporating the microchannels (2) in a weaving device; interweaving the tubular microchannels (2) with a plurality of warp wires (3) in the weaving device, and generating at least one heat exchanger mat (4) from the tubular microchannels (2) which are connected to one another by means of the warp wires (3); shaping at least one heat exchanger pack (8) from the at least one heat exchanger mat (4), in particular by folding and/or rolling up the heat exchanger mat (4); and adhesively bonding the tubular microchannels (2) at two mutually opposite end sides (9, 10) of the heat exchanger pack (8).

9 Claims, 3 Drawing Sheets

(56) References Cited

U.S. PATENT DOCUMENTS

| | | | | |
|---|---|---|---|---|
| 4,940,617 | A * | 7/1990 | Baurmeister | B01D 63/02 428/113 |
| 5,297,591 | A | 3/1994 | Baurmeister | |
| 5,429,184 | A * | 7/1995 | Bach | A61M 1/1698 165/149 |
| 5,449,457 | A * | 9/1995 | Prasad | B01D 61/38 210/321.8 |
| 5,747,138 | A * | 5/1998 | Leonard | B01D 63/02 428/113 |
| 5,762,868 | A * | 6/1998 | Leonard | B01D 63/02 422/46 |
| 5,876,667 | A * | 3/1999 | Gremel | B01D 19/0031 422/44 |
| 6,113,782 | A * | 9/2000 | Leonard | B01D 63/022 210/321.89 |
| 6,117,390 | A * | 9/2000 | Corey, Jr. | A61M 1/1698 422/45 |
| 8,557,159 | B2 * | 10/2013 | Montoya | B01D 63/021 264/263 |
| 8,580,184 | B2 * | 11/2013 | Montoya | B29C 39/10 264/607 |
| 8,865,067 | B2 * | 10/2014 | Olson | B23P 19/04 422/45 |
| 9,925,730 | B2 * | 3/2018 | Montoya | D01D 5/24 |
| 10,012,444 | B2 | 7/2018 | Eplee | |
| 2011/0011572 | A1 | 1/2011 | Nagurny et al. | |

FOREIGN PATENT DOCUMENTS

| | | |
|---|---|---|
| CN | 103322837 | 9/2013 |
| CN | 104010755 | 8/2014 |
| CN | 106931804 | 7/2017 |
| DE | 2 012 883 | 9/1971 |
| DE | 10 2017 128 665 | 6/2019 |
| JP | 56-500864 | 6/1981 |

\* cited by examiner

METHOD FOR PRODUCING A MICROCHANNEL BUNDLE HEAT EXCHANGER

CROSS REFERENCE TO RELATED APPLICATION

This application claims priority under 35 USC 119 to German Patent Appl. No. 10 2019 101 740.8 filed on Jan. 24, 2019, the entire disclosure of which is incorporated herein by reference.

BACKGROUND

Field of the Invention

The invention relates to a method for producing a microchannel bundle heat exchanger.

Related Art

Heat exchangers are used for cooling charge air in motor vehicles. These heat exchangers often have a relatively high mass. Energy consumption and driving characteristics of the motor vehicle can be improved by reducing the weight of the heat exchanger.

German patent application DE 10 2017 128 665.9 discloses a microchannel bundle heat exchanger with a multiplicity of tubular microchannels from plastic. A flow of a hot medium, such as hot combustion air, flows through these tubular microchannels during operation, and a flow of a cooling medium, such as cooling air or a cooling liquid, flows around these tubular microchannels so that a heat exchange can take place between the hot medium and the cooling medium. The tubular microchannels typically have a diameter of 0.5 mm to 2 mm and preferably are spaced apart by a spacing of 0.25 mm to 1.0 mm. Mechanical stability for the microchannel bundle heat exchanger is provided by intermediate plates that are perforated by boring, laser machining, or sintering. The tubular microchannels are inserted into the holes formed in the intermediate plates in the production of the microchannel bundle heat exchanger and are connected in a materially integral manner to the intermediate plates by brazing/soldering or adhesive bonding.

A microchannel bundle heat exchanger of this type is distinguished by a low weight since the tubular microchannels are produced from plastic. A large number of tubular microchannels (for example up to 10,000 microchannels) is used in the production of a microchannel bundle heat exchanger to provide a correspondingly large heat exchanger surface. Furthermore, a minor pressure loss of the cooling medium arises as compared to a so-called fin-surrounding flow.

Apart from these advantages, the microchannel bundle heat exchanger, however, also has some disadvantages. For example, the production of the microchannel bundle heat exchanger is a completely manual process. This means that all tubular microchannels are threaded manually into the holes of the intermediate plates. This process is therefore extremely time-consuming and is susceptible to errors. Furthermore, generating the holes in the intermediate plates is very time-consuming especially when this takes place by boring or sintering.

The invention is based on the object of providing a simple and cost effective method for producing a microchannel bundle heat exchanger.

SUMMARY

A method for producing a microchannel bundle heat exchanger according to the invention comprises the following steps:
providing a multiplicity of tubular microchannels;
incorporating the microchannels in a weaving device;
interweaving the tubular microchannels with a plurality of warp wires in the weaving device, and generating at least one, preferably planar, heat exchanger mat from the tubular microchannels that are connected to one another by the warp wires;
shaping at least one heat exchanger pack from the at least one heat exchanger mat, such as by folding and/or rolling up the heat exchanger mat; and
adhesively bonding the tubular microchannels at two mutually opposite ends of the heat exchanger pack.

The method enables production of a microchannel bundle heat exchanger can take place in a particularly simple and precise manner, and with a high degree of automation. A substantial advantage of the method is that the intermediate plates into which the tubular microchannels to date had to be manually threaded and subsequently brazed/soldered or adhesively bonded is dispensed with completely. This results in substantial advantages in the production of the microchannel bundle heat exchanger so that the production costs can be reduced significantly. It is thus achieved that microchannel bundle heat exchangers of this type can be produced in volume production in a relatively cost-effective manner. The production of the microchannel bundle heat exchanger can take place in a completely automated process. On account of the adhesive bonding of the heat exchanger pack on both sides, a separation between the internal and the external side of the tubular microchannels advantageously is achieved, with the separation being indispensable for a mixing-free heat exchange. The microchannel bundle heat exchanger can be produced from one or a plurality of heat exchanger packs.

The tubular microchannels of some embodiments can be entwined twice by the warp wires during the weaving process in the weaving device to achieve a particularly secure and mechanically stable holding bond between the microchannels and the warp wires.

A tightly packed heat exchanger pack may be generated from the tubular microchannels by the shaping, in particular by the folding and/or the rolling-up, of the planar heat exchanger mat. A dense, tightly packed, heat exchanger pack has a positive effect in terms of an efficient heat exchange.

In some embodiments, the tubular microchannels of the heat exchanger pack may be bonded adhesively at both mutually opposite ends of the heat exchanger pack by dipping into an epoxy adhesive bath. The heat exchanger pack is thus dipped into the epoxy adhesive bath on both sides so that the adhesive bonding can take place in a very simple manner and the separation between the internal and the external side of the tubular microchannels, as described above, is created, to provide a mixing-free heat exchange.

The tubular microchannels may be made from polyether ether ketone (PEEK), polyether ketone ketone (PEKK), or polyimide, are used. The polyimide can be configured, for example, as polysuccinimide (PSI) and/or polybismaleimide (PBMI) and/or polyoxadiazobenzimidazole (PBO) and/or polyimide sulfone (PISO) and/or polymethacrylimide (PMI) and/or other plastics material having an imide group. The tubular microchannels may be extruded in the production. Extruding is provided in particular when the tubular microchannels are composed of PEEK or PEKK. Alternatively, the tubular microchannels can be dip-molded. Such a production method may be provided when the tubular microchannels are composed of polyimide.

The tubular microchannels can also be produced from other suitable material. For example, tubular microchannels can be made from stainless steel if a high mechanical stability is required. However, microchannels made from stainless steel have a greater mass as compared to tubular microchannels from plastic.

The tubular microchannels may have an external diameter between 0.3 mm and 3 mm, in particular between 0.5 mm and 2 mm.

Warp wires that have a thickness of approximately 50 µm are used in certain embodiments. An effective holding bond with the tubular microchannels can be achieved with the aid of these warp wires.

The heat exchanger pack may be accommodated in a heat exchanger housing. The heat exchanger housing can have at least one inlet for the hot medium and at least one outlet for the cooling medium. The heat exchanger housing also can be configured such that the tubular microchannels can be surrounded by a flow of the cooling medium across a large area.

At least one radial groove may be incorporated laterally in each of the two ends of the heat exchanger pack after the adhesive bonding of the tubular microchannels. The at least one radial groove may receive a sealing element to seal the microchannel bundle heat exchanger, for example in relation to the housing. Two parallel radial grooves can be incorporated in each of the opposite ends, and a sealing element, in particular an O-ring, can be disposed in each of the two grooves.

Further features and advantages of the invention will become evident by means of the description hereunder of preferred exemplary embodiments with reference to the appended illustrations.

DETAILED DESCRIPTION

A method for producing a microchannel bundle heat exchanger 1 includes a step of providing a multiplicity of tubular microchannels 2. The tubular microchannels 2 preferably are composed of a flexible and elastic plastics material. Thus, the microchannel bundle heat exchanger 1 can be designed in a particularly weight-optimized manner. Suitable plastics materials are in particular polyether ether ketone, polyether ketone ketone, or polyimide. The polyimide can be configured, for example, as polysuccinimide (PSI) and/or polybismaleimide (PBMI) and/or polyoxadiazobenzimidazole (PBO) and/or polyimide sulfone (PISO) and/or polymethacrylimide (PMI) and/or as any other plastics material having an imide group. The tubular microchannels 2 may be extruded in the production of the microchannel bundle heat exchanger 1. Extruding is provided when the tubular microchannels are composed of PEEK or PEKK. Alternatively, the tubular microchannels can be dip-molded. Such a production method preferably is provided when the tubular microchannels 2 are composed of polyimide. Alternatively, the tubular microchannels 2 can also be produced from stainless steel. However, a microchannel bundle heat exchanger 1 in which the tubular microchannels 2 are produced from stainless steel has a greater mass than a microchannel bundle heat exchanger 1 in which the tubular micro channels 2 are produced from plastics material.

Tubular microchannels 2 with an external diameter between 0.3 mm and 3 mm, in particular between 0.5 mm and 2 mm preferably are used. For example, several hundred tubular microchannels 2 can be provided for the production of the microchannel bundle heat exchanger 1, based on the diameter of the tubular microchannels 2. Design embodiments of the microchannel bundle heat exchanger 1 having more than 1000 tubular microchannels 2 are possible.

Figure 1:
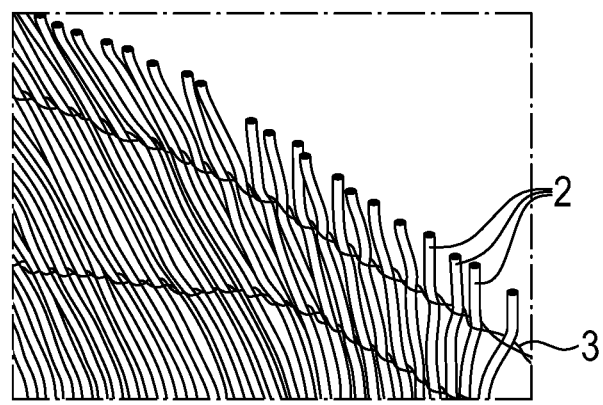
FIG. 1 shows a perspective view of a plurality of tubular microchannels which are interwoven with warp wires and from which a microchannel bundle heat exchanger can be produced.
Figure 2:
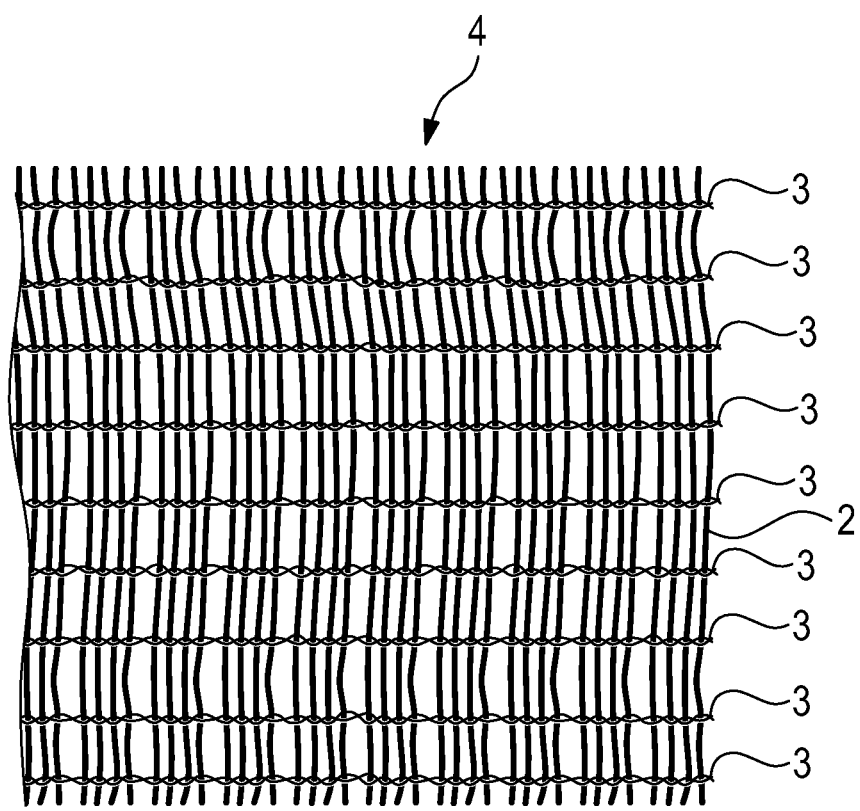
FIG. 2 shows a planar heat exchanger mat from which a heat exchanger pack of the microchannel bundle heat exchanger can be shaped.

The tubular microchannels 2 are incorporated in a weaving device, in particular clamped therein, and by means of the weaving device are interwoven with the warp wires 3. The tubular microchannels 2 in this weaving process preferably are intertwined on both sides by the warp wires 3. FIG. 1 shows plural tubular microchannels 2 intertwined on both sides by the warp wires 3. Warp wires 3 with a thickness of approximately 50 µm preferably are used for this weaving process in the weaving device to achieve a stable holding bond between the tubular microchannels 2 and the warp wires 3. In this way, a planar heat exchanger mat 4, as illustrated in FIG. 2, is obtained from the tubular microchannels 2 that are connected to one another by the warp wires 3.

Figure 3:
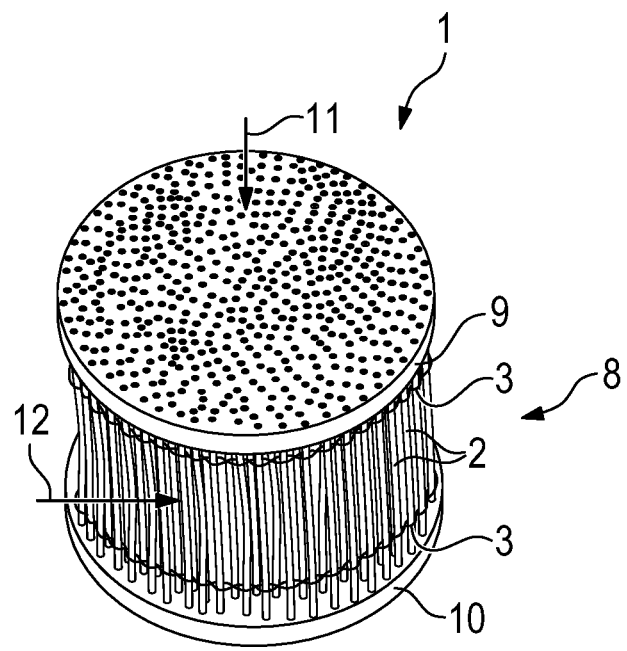
FIG. 3 shows a heat exchanger pack that is produced by rolling-up and adhesively bonding the heat exchanger mat on both sides.

FIG. 3 shows that a heat exchanger pack 8 can be shaped from the heat exchanger mat 4 in a subsequent shaping process, in particular by folding and/or rolling-up. For example, the planar heat exchanger mat 4 can be rolled-up as tightly as possible, as shown in FIG. 3, so that a tightly packed, in particular round, heat exchanger pack 8 is created from the tubular microchannels 2. The heat exchanger pack 8 obtained in this way then has each of the two opposite ends 9, 10 dipped into an epoxy adhesive bath. Thus, two adhesively bonded end-side connections of the heat exchanger pack 8 hold the tubular microchannels 2 together. Moreover, a separation between an internal and an external side of the tubular microchannels 2 is also created in this way, with this separation being important for a mixing-free heat exchange. Moreover, the geometric spacings of the tubular microchannels 2 are also important and spacings are chosen such that an efficient thermal transfer can take place from the hot medium to the cooling medium. The flow direction of the hot medium in FIG. 3 is symbolized by an arrow 11. The hot medium during the operation of the microchannel bundle heat exchanger 1 thus flows through the tubular microchannels 2. The incident flow onto the cooling medium takes place laterally as symbolized by an arrow 12 in FIG. 3. Alternatively, the cooling medium can flow through the tubular microchannels 2, and the incident flow of the hot medium can take place laterally.

Figure 4:
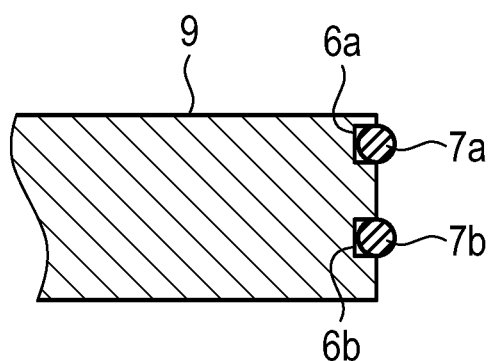
FIG. 4 shows a detail view of one of the end sides of the heat exchanger pack having sealing elements incorporated therein.

Two radial grooves 6a, 6b are incorporated laterally in each of the two mutually opposite end sides 9, 10 after the curing of the adhesively bonded connections and each receives a sealing element. FIG. 4 shows the end 9 having the radial grooves 6a, 6b incorporated therein, and the sealing elements configured as O-rings 7a, 7b are disposed in the radial grooves 6a, 6b. These O-rings 7a, 7b effectively seal the microchannel bundle heat exchanger 1 in the heat exchanger housing 5.

Figure 5:
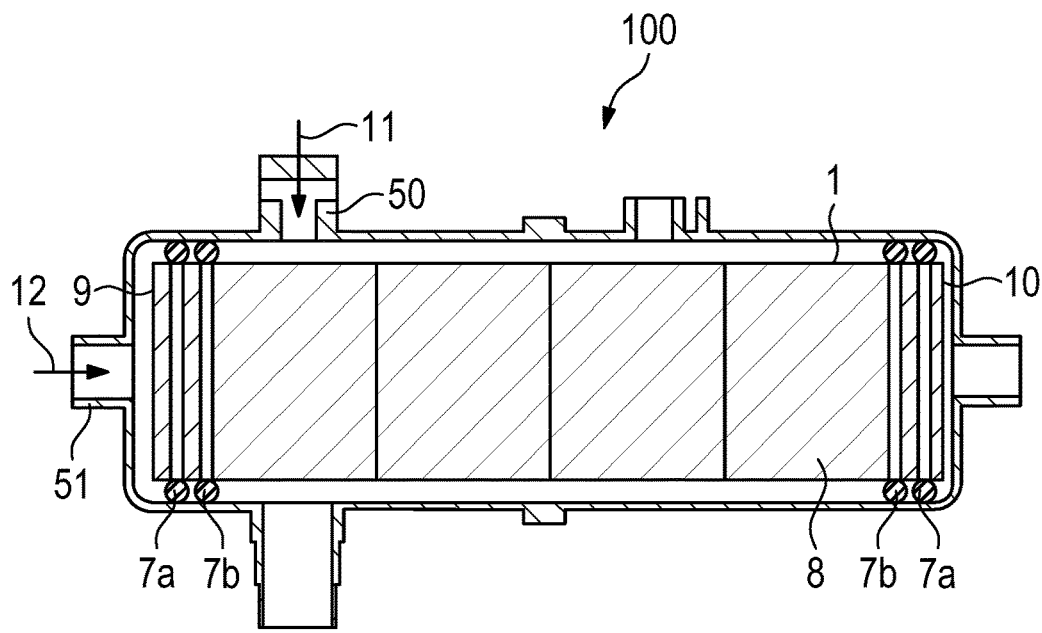
FIG. 5 shows a section through the heat exchanger after being accommodated in a heat exchanger housing.

FIG. 5 shows the microchannel bundle heat exchanger 1 accommodated in a heat exchanger housing 5 of the heat exchanger installation 100. The heat exchanger housing 5 has a first inlet 50 for the hot medium and a second inlet 51 for the cooling medium. The cooling medium flows in through the second inlet 51 during the operation of the heat exchanger installation 100 and flows through the tubular microchannels 2 of the microchannel bundle heat exchanger 1 that are surrounded by a flow of the hot medium that flows in through the first inlet 50. The flow can also take place in the reversed manner so that the hot medium flows in through the second inlet 51 and the cooling medium flows in through the first inlet 50. The cooling medium in this instance flows to surround the tubular microchannels 2 that are passed through by a flow of the hot medium.

In principle, almost any arbitrary microchannel bundle heat exchanger 1 can be produced, in particular by rolling-up and/or folding, with the aid of the heat exchanger mat 4 woven in the manner described above and the heat exchanger packs 8 shaped therefrom. The microchannel bundle heat exchanger 1 can be produced from one heat exchanger pack 8, or from plural heat exchanger packs 8.

Figure 6:
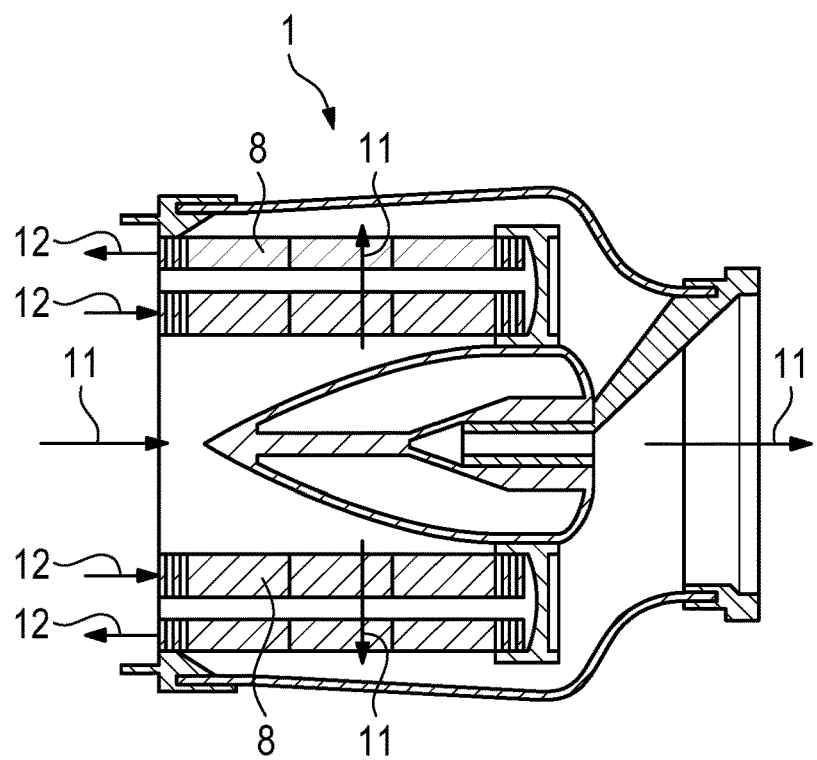
FIG. 6 shows a sectional illustration of a heat exchanger embodied in a round-channel construction mode, said heat exchanger being provided in particular for charge air cooling.

FIG. 6 in an exemplary manner shows a sectional illustration of a microchannel bundle heat exchanger 1 embodied in the round-channel construction mode and provided for charge air cooling. The hot charge air flows centrally into the round microchannel bundle heat exchanger 1 that is shaped in a hollow-cylindrical manner. The round hollow-cylindrical shape is obtained by plural heat exchanger packs 8 composed of wound heat exchanger mats 4 of the type described above. The heated charge air flows radially through the heat exchanger packs 8 of the microchannel bundle heat exchanger 1, and the tubular microchannels 2 are passed through by a flow of the cooling medium.

By folding the woven heat exchanger mats 4 piece-by-piece on top of one another, microchannel bundle heat exchangers 1 that are of rectangular shape can also be produced and can be used as lightweight replacements for conventional coolant/air front radiators in motor vehicles.

What is claimed is:

1. A method for producing a microchannel bundle heat exchanger, comprising:
   providing a multiplicity of tubular microchannels;
   incorporating the microchannels in a weaving device;
   interweaving the tubular microchannels with a plurality of warp wires in the weaving device, and generating at least one heat exchanger mat from the tubular microchannels that are connected to one another by the warp wires;
   shaping at least one heat exchanger pack from the at least one heat exchanger mat by folding and/or rolling up the heat exchanger mat;
   adhesively bonding the tubular microchannels at opposite ends of the heat exchanger pack by applying adhesive to end regions of the microchannels and curing the adhesive;
   forming at least one radial groove laterally in each of the adhesive at each of the opposite ends of the heat exchanger pack; and
   disposing sealing elements respectively in each of the grooves.

2. The method of claim 1, wherein that the tubular microchannels are twice entwined by the warp wires during the interweaving in the weaving device.

3. The method of claim 1, wherein a tightly packed heat exchanger pack is generated from the tubular microchannels by the shaping of the planar heat exchanger mat.

4. The method of claim 1, wherein the step of adhesively bonding the tubular microchannels at opposite ends of the heat exchanger pack comprises dipping the heat exchanger pack into an epoxy adhesive bath.

5. The method of claim 1, wherein the tubular microchannels are made from plastic.

6. The method of claim 1, wherein the tubular microchannels are made from stainless steel.

7. The method of claim 1, wherein the tubular microchannels have an external diameter between 0.3 mm and 3 mm.

8. The method of claim 1, wherein the warp wires have a thickness of approximately 50 μm.

9. The method of claim 1, further comprising accommodating the heat exchanger pack in a heat exchanger housing so that the sealing elements engage inner surface regions of the heat exchanger housing.

* * * * *